(12) United States Patent
Sugiyama et al.

(10) Patent No.: US 6,999,261 B2
(45) Date of Patent: Feb. 14, 2006

(54) MAGNETIC DISK DEVICE AND SERVO WRITE METHOD

(75) Inventors: Kenichiro Sugiyama, Chiyoda (JP); Kei Yasuna, Chiyoda (JP); Marutomo Goto, Odawara (JP); Takashi Yamaguchi, Tsuchiura (JP)

(73) Assignee: Hitachi Global Storage Technologies Japan, Ltd., Odawara (JP)

( * ) Notice: Subject to any disclaimer, the term of this patent is extended or adjusted under 35 U.S.C. 154(b) by 569 days.

(21) Appl. No.: 10/075,234

(22) Filed: Feb. 15, 2002

(65) Prior Publication Data

US 2002/0186494 A1    Dec. 12, 2002

(30) Foreign Application Priority Data

Jun. 6, 2001    (JP) .............................. 2001-170614

(51) Int. Cl.
    *G11B 21/02*    (2006.01)
(52) U.S. Cl. ....................................................... 360/75
(58) Field of Classification Search ................. 360/75, 360/48; 427/129
    See application file for complete search history.

(56) References Cited

U.S. PATENT DOCUMENTS

| | | | |
|---|---|---|---|
| 5,184,257 A * | 2/1993 | Koga et al. | 360/77.05 |
| 5,612,833 A | 3/1997 | Yarmchuk et al. | |
| 6,040,955 A | 3/2000 | Brown et al. | |
| 6,091,559 A * | 7/2000 | Emo et al. | 360/48 |
| 6,118,614 A | 9/2000 | Lee | |
| 6,151,187 A | 11/2000 | Ogawa | |
| 6,344,942 B1 * | 2/2002 | Yarmchuk | 360/75 |
| 6,437,935 B1 | 8/2002 | Johnson et al. | |
| 6,504,663 B1 * | 1/2003 | Hirano et al. | 360/48 |
| 6,627,254 B1 * | 9/2003 | Angelo et al. | 427/129 |

FOREIGN PATENT DOCUMENTS

| | | |
|---|---|---|
| JP | 5-128766 | 5/1993 |
| JP | 08-212733 | 8/1996 |
| JP | 08-235749 | 9/1996 |
| JP | 11-066776 | 3/1999 |
| JP | 11-259999 | 9/1999 |

* cited by examiner

*Primary Examiner*—K. Wong
(74) *Attorney, Agent, or Firm*—Antonelli, Terry, Stout and Kraus, LLP.

(57) ABSTRACT

Servo-write arrangements to self-record servo signals onto magnetic disk arrangements.

13 Claims, 9 Drawing Sheets

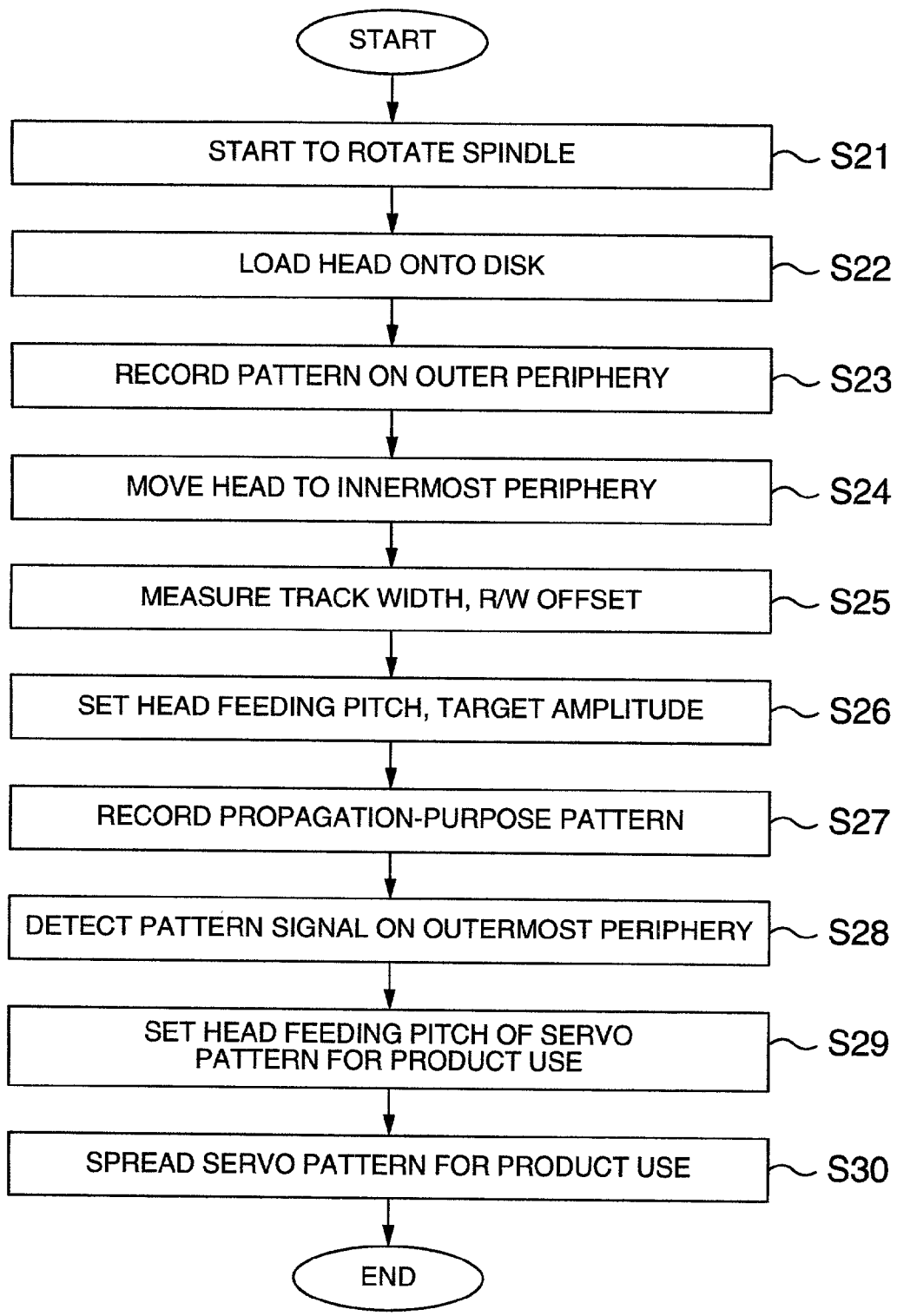

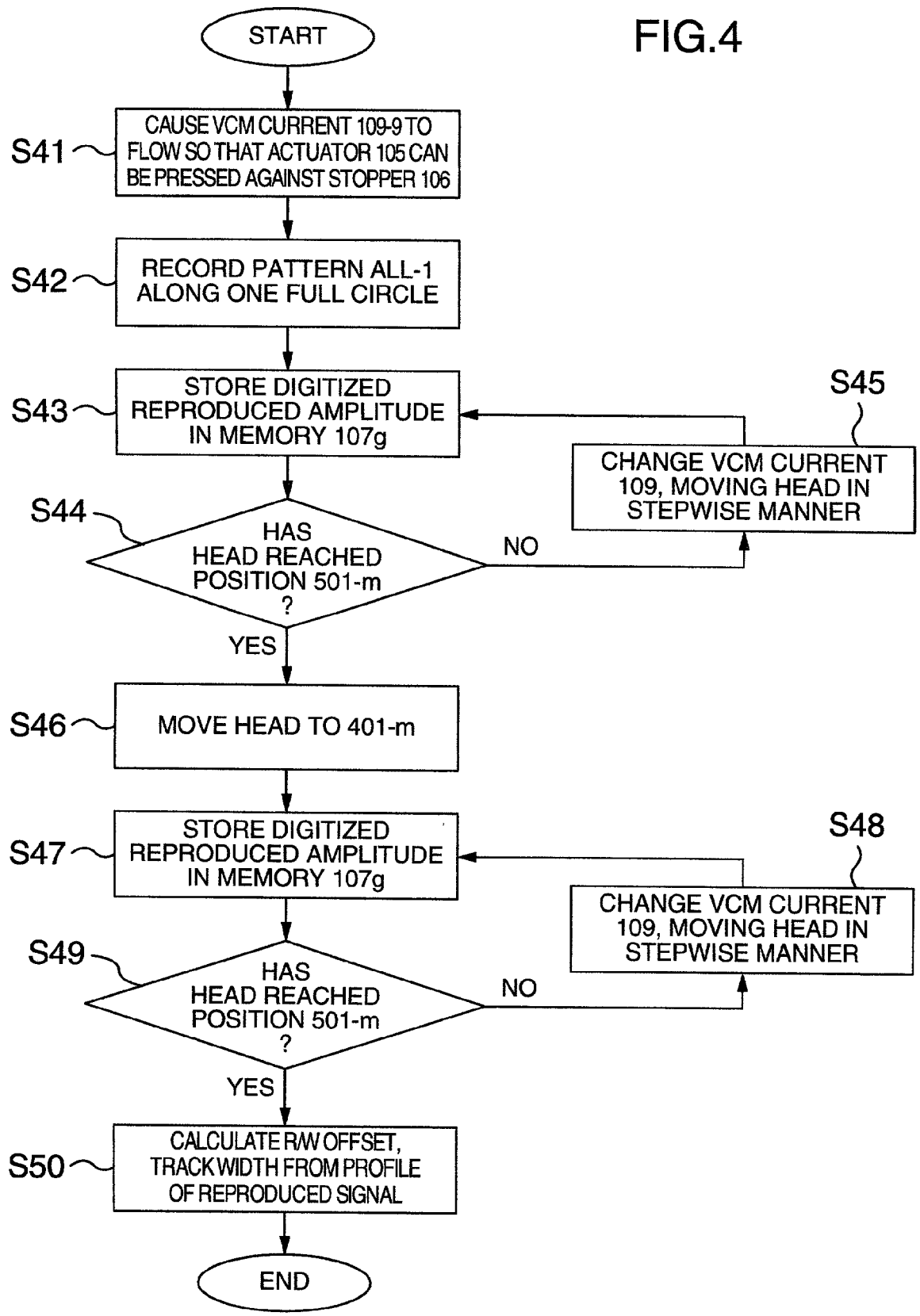

MAGNETIC DISK DEVICE AND SERVO WRITE METHOD

BACKGROUND OF THE INVENTION

The present invention generally relates to magnetic disk devices such as hard disk drives, and particularly to a technique of writing servo signals for positioning magnetic heads on magnetic disks.

As one of servo write methods, there is known the self servo-write method for recording servo track information in a magnetic disk device by controlling the magnetic head (hereafter, simply referred to as head) and actuator of a product itself without using any external writing device. This method is concretely disclosed in Japanese Patent No. 2921604 (W096/28814) and JP-A-8-255448.

In the former, reference information for positioning a head, i.e., a servo signal, is written after a head is pressed against a stopper, and the amount of head-feeding, or pitch for positioning is calculated while being adjusted according to the amplitude of its reproduced waveform.

In the latter, the magnetic head is moved by using an external writing device within a clean room so that servo information as a reference can be previously recorded on a part of a magnetic disk (hereafter, simply referred to as disk), and the amount of head-feeding, or pitch for positioning is calculated by reading the recorded pattern.

In the former, however, the regions over which information is written on the disk cannot be fixed, or determined because the head's core width varies, i.e., because very small read and write elements have their tolerances of mounting or size.

Moreover, in order to execute the latter, it is necessary to record a servo signal on part of the disk by using an external writing device. Thus, the latter has the drawback that it spoils the advantage of the self servo-write that does not need any external writing device. In addition, it requires a clean room as a large-scale facility.

SUMMARY OF THE INVENTION

The present invention is to provide the self servo-write capable of removing the necessity of using an external writing device for recording a preliminary servo signal, and definitely determining an information writing region by use of the magnetic disk device itself on the disk that this device has, thereby assuring a designed number of tracks to be recorded in this fixed region.

The above objective of the invention can be achieved by providing a magnetic disk device in which a servo-write method is executed by writing a recording region detecting signal on a magnetic disk that the magnetic disk device has when a magnetic head the device itself has is initially loaded onto the disk at a stage where a positioning signal for the head is not recorded yet, and determining a servo signal writing region of the magnetic disk on the basis of the position where the recording region detecting signal has been written on the disk.

According to the invention, the amount the head is fed when the servo signal is written can be adjusted on the basis of the amount the head is fed according to a propagation-purpose pattern recorded in the radius direction of the disk between the ends of the servo signal writing region with one end selected as the position at which the recording region detecting signal has been written and with the other end selected as a stop position at which the head is stopped by, for example, a stopper.

In addition, the magnetic disk device of the invention has a magnetic disk for storing information, a magnetic record head for recording information on the disk, and a magnetic reproduce head for reproducing information from the disk, wherein the recording region detecting signal is written on the disk just when the head is loaded onto the disk on which any positioning signal for the head is not stored yet, and a region of tracks to be recorded on the disk is determined on the basis of the position at which the recording region detecting signal has been written.

Moreover, according to the invention, just when the head is initially moved, or fed onto the disk from, for example, a ramp road on the outer periphery side, a current is caused to flow to the head, thereby writing a signal on the disk along the outermost periphery. Then, the head is further fed toward the inner periphery side, and fed back toward the outer periphery side. When it is fed back toward the outer periphery, the propagation-purpose signal is written at a certain pitch. At this time, the signal written when the head is initially loaded onto the disk will be detected. This detected signal is recognized as the outermost periphery of the region over which information is to be written on the disk. Thus, a track pitch necessary when a product-purpose servo signal is written can be calculated from the distance between the innermost periphery and the outermost periphery, and from a designed number of tracks. Therefore, since the servo-write can be performed by use of the head that the magnetic disk device itself has, it is not necessary to record servo tracks within a clean room by using an external writing device as in the prior art.

Additionally, according to the invention, since the track region is provided between the position at which the recording region detecting signal is written, and the stop position at which the head is stopped by a stopper, servo tracks can be recorded by the magnetic head that each magnetic disk device has.

In addition, the recording region detecting signal is written in the loading area between the ramp road and the servo signal. Also, since the write current is caused to flow to the head only during the time interval from when the magnetic head lies at a constant position on the ramp road to just when the magnetic head is loaded onto the disk, the recording region detecting signal can be written at a predetermined position on the magnetic disk. Additionally, the time duration, or transition time in which the magnetic head is initially loaded onto the disk from a constant position at which the disk lies on the ramp road can be calculated from the distance the magnetic head has been moved and the speed at which the head is moved, by means for making such calculation. According to the invention, the servo region can be easily determined by using the head the magnetic disk device itself has.

Moreover, when the head is fed back from the stop position to which the head is regulated in its movement by the stopper to sequentially record the propagation-purpose pattern in the radius direction of the disk, and detects the recording region detected signal, the detected position is recognized as one end of the track region, thus making it possible to easily find the servo signal recorded region.

Additionally, the pitch at which the head is fed to record a product-purpose servo signal can be calculated from the number of times that the head is fed, to record the propagation-purpose pattern, back from the stop position to which the head is regulated by the stopper until the recording region detecting signal is detected, and from a designed number of tracks, thus making it possible to assure the designed number of tracks.

According to the invention, when the magnetic disk device makes self servo-write operation, the information written region on the magnetic disk can be determined by the head the device itself has, so that the designed number of tracks can be assured. Therefore, it is not necessary to provide an external writing device and a writing environment such as a clean room.

Other objects, features and advantages of the invention will become apparent from the following description of the embodiments of the invention taken in conjunction with the accompanying drawings.

BRIEF DESCRIPTION OF THE DRAWINGS

FIG. 2 is a flowchart for a procedure of servo write according to the invention.

FIG. 4 is a flowchart for a procedure of measuring the track width of head and R/W offset.

DESCRIPTION OF THE EMBODIMENTS

Figure 1:
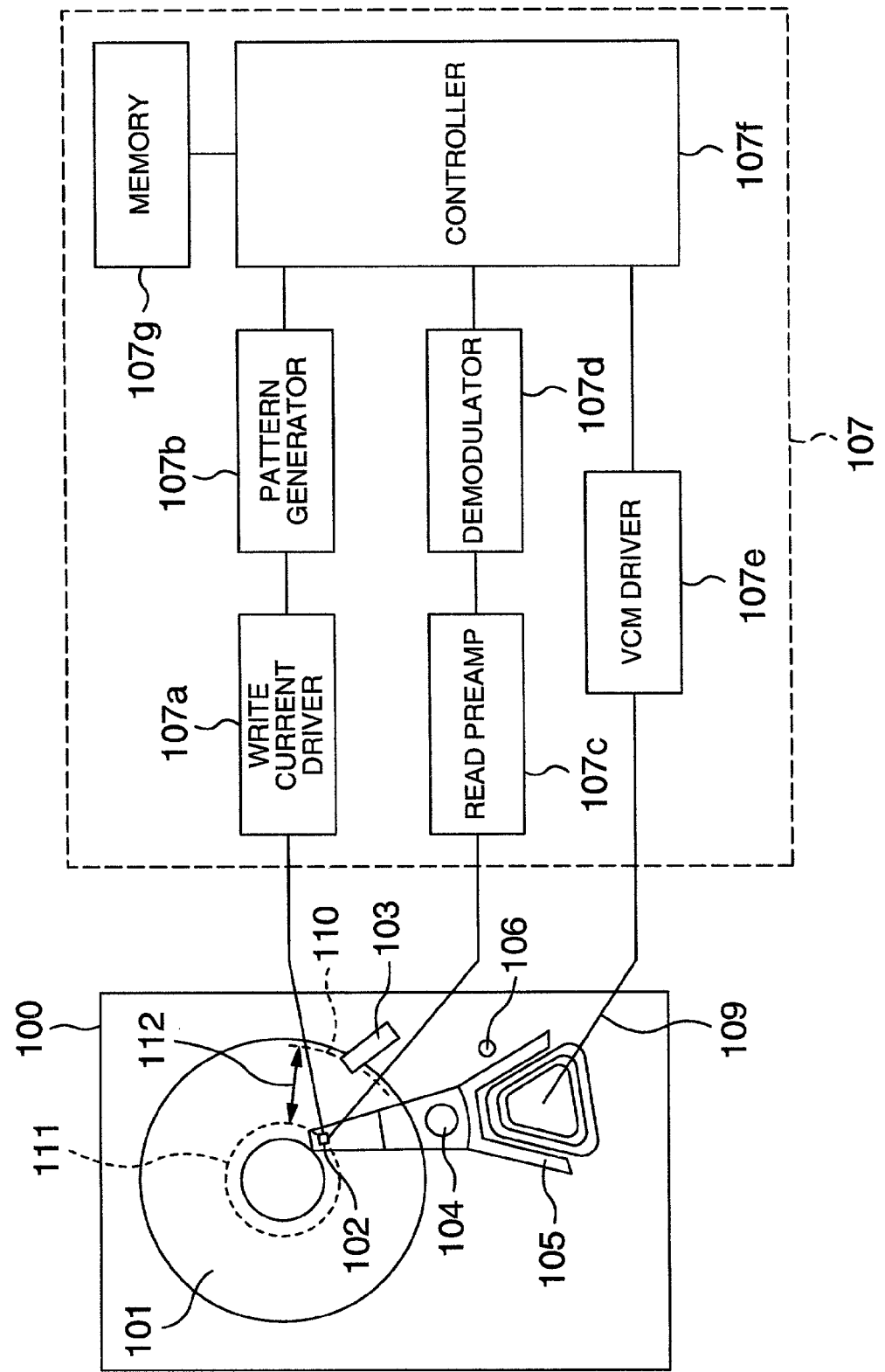
FIG. 1 is a block diagram of one embodiment of the magnetic disk device according to the invention.

An embodiment of the invention will be first described briefly. According to this embodiment, in a magnetic disk device 100 as shown in FIG. 1, a head 102 as a product itself is used to record a servo signal (hereafter, called servo-write) on a disk 101 in which any information is not recorded yet.

In order to make servo-write, first the disk 101 and head 102 are properly built and sealed within a housing, and then a current to head 102 is instantaneously turned on and off when the head 102 is loaded, so that a signal 110 for positioning can be recorded on the outermost periphery of the disk. The distance between the position of this recorded positioning signal 110 and the innermost periphery 111 of the disk to which the head is regulated by a stopper 106 is a recordable region's width 112 for product use. Then, servo-write is performed while the amount of head feeding is being adjusted on the basis of the track spacing calculated from the designed number of tracks.

FIG. 1 schematically shows the construction of the magnetic disk device according to the invention, and the flow of signal in the servo-write operation. This embodiment will be further described in detail with reference to FIG. 1. The magnetic disk device 100 has the disk 101 for storing information, and the head 102 for recording/reproducing a signal on/from the disk. The head 102 is supported to be rotatable around a pivot 104, and moved in any radial direction on disk 101 by an actuator 105.

In addition, a ramp road 103 is a retraction place onto which the head 102 is retreated from the disk surface. When servo-write is performed on this magnetic disk device 100, an operation control circuit unit 107 is mounted on the disk device so that it can control the head 102 and actuator 105.

As described previously, the magnetic disk device 100 of this embodiment does not use an external writing device, but use the head 102 and actuator 105 provided within itself to record signals on disk 101, and to again record new patterns with the head offset on the basis of the reproduced signal of this recorded pattern, thus forming a servo signal on the disk recording region.

This operation control circuit unit 107 is not necessarily the same as one for making the magnetic disk device 100 operate as a product. The operation control circuit unit 107 includes a write current driver 107a for writing patterns, a pattern generator 107b, a preamplifier 107c for processing the reproduced signal, a demodulator 107d, a VCM (voice coil motor) driver 107e for driving the actuator, a controller 107f for controlling these functions, and a memory 107g for storing parameters that are required for the operation.

FIG. 2 shows a procedure (steps S) for servo-write operation of the magnetic disk device having those elements according to the invention. First, the spindle is started to rotate, and reached to a predetermined rotational speed (S 21).

Then, the actuator 105 is driven by the VCM driver 107e to move the head 102 from the ramp road 103 onto the area on the disk 101 (hereafter, referred to as loading of head) (S22).

At the time of loading, the write current to the head 102 is turned on so that a signal can be written on the disk 101 at the same time. A constant time after the writing of signal, the write current is turned off so that the written signal can be recorded only on the vicinity of the outermost periphery of the disk 101 (S23).

At this time, although the head 102 lies on the disk 101, other head positioning signals are not recorded yet on the disk and thus the radial position of head 102 on the disk 101 cannot be detected. Therefore, after the loading, the head 102 is not stopped but moved to the inner periphery of the disk until the actuator 105 hits the stopper 106 on the innermost periphery of the disk (S24).

Thereafter, a current 109 flowing in the VCM is made constant on this innermost periphery so that the actuator can be pressed against the stopper, or that the head 102 can be substantially fixed in its position. Then, the current 109 is changed to finely adjust the position of head 102, and R/W offsets and track width are measured (S25).

Further, the feed pitch is set on the basis of the information of measured track width (S26), and a servo pattern (hereafter, referred to as propagation-purpose pattern) is recorded that is used to determine the head position when a servo signal is recorded later in the radial direction (S27).

When the propagation-purpose pattern is recorded up to around the outermost periphery, the head 102 detects the initial pattern signal written at the time of loading, and at this time it ends the recording of propagating pattern from the innermost periphery (S28).

Here, by using the relation between the amounts of head feeding from the inner periphery to the outer periphery, and the number of tracks of servo pattern to be written, the device calculates the pitch of head feeding for writing a servo pattern (hereafter, called product-purpose servo signal) by which the head 102 can be located at a certain track in order to write/read information (S29).

Then, the product-purpose servo signal is again sequentially recorded toward the inner periphery, and the servo-write operation is finished when the product-purpose servo signal of a certain number of tracks has finally been completely written (S30).

The feature of the magnetic disk device of the invention, as described above, is to write a signal when the head is loaded at step 22 under the condition that any positioning signal is not yet recorded on the disk, and to make the outermost periphery on which the signal 110 has been written be used as one end of the radial region 112 across which tracks are to be recorded in the radial direction.

Therefore, since the servo-write operation is performed to fix one end of the radial region across which tracks are to be recorded on the disk in the radius direction, and store the number of steps that the head has been fed over the distance from the innermost periphery to the outermost periphery in order to record the propagation-purpose pattern, there is an advantage that, even though the head core width has a distribution, or dispersion, the number of tracks designed can be assured by recalculating the head feeding pitch that is necessary for writing the product-purpose servo signal on the basis of the ratio of the head feeding pitch to the number of tracks designed.

The procedure shown in FIG. 2 will be further described in detail. A description will be made of the procedure for the operation of writing a signal at the time of loading. First, as at step 21, when the spindle is started, the revolution speed is fixed to a predetermined value. By causing a DC current to flow to the actuator 105, the head 102 is urged to move toward the outer periphery side and pressed against the end of ramp road 103.

Figure 3A:
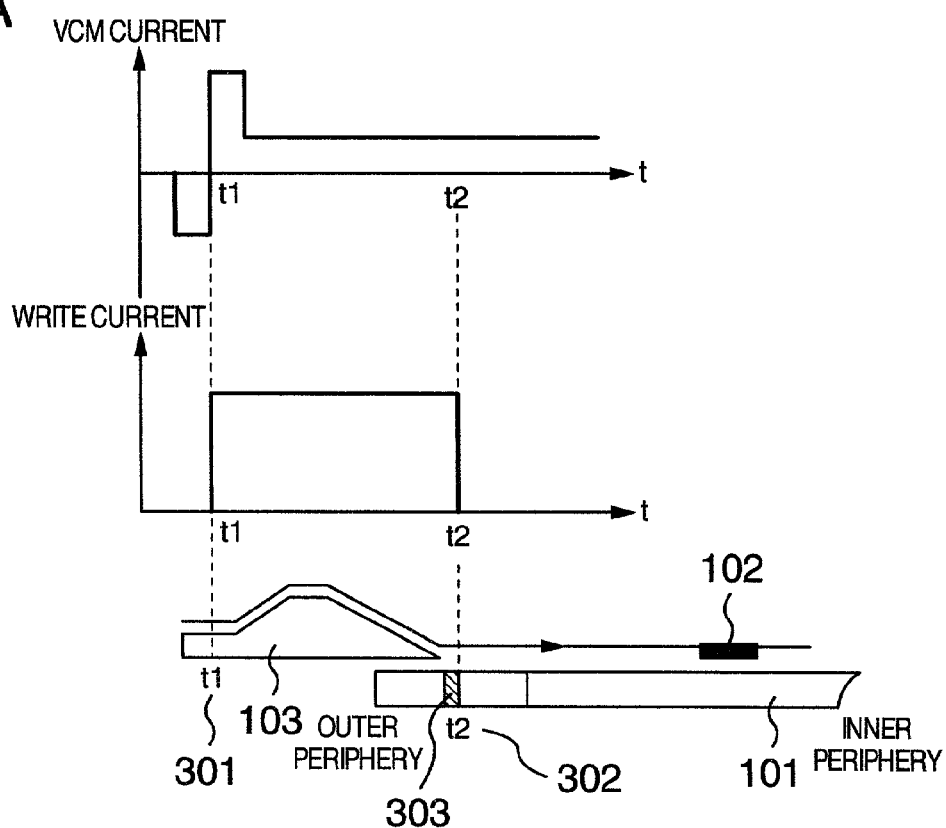
FIGS. 3A–3C are diagrams showing the movement of a head while it is writing a pattern signal in the invention.

Then, when a DC current is again caused to flow to the actuator 105 and to move it toward the inner periphery, thereby making the loading of head 102 on the disk, a write current is simultaneously supplied to the record head at time $t_1$ (301) at which the head 102 lies on the ramp road 103 as shown in FIG. 3A.

In this embodiment, time $t_1$ (301) is when the DC current is started to flow, i.e., when a counter-electromotive force from the actuator 105 is detected, and thereafter the write current to the record head is turned off when the head 110 has initially reached onto the disk 101 (time $t_2$ (302)).

Figure 3B:
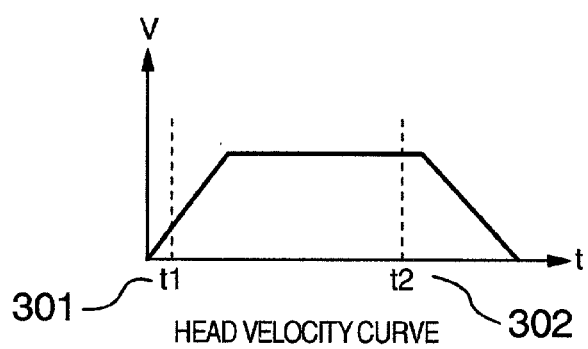

The write end time $t_2$ (302) is determined as follows. The actuator 105 is controlled by a speed control method in which the counter-electromotive force from the actuator 105 itself is detected, as shown by the velocity curve in FIG. 3B.

Figure 3C:
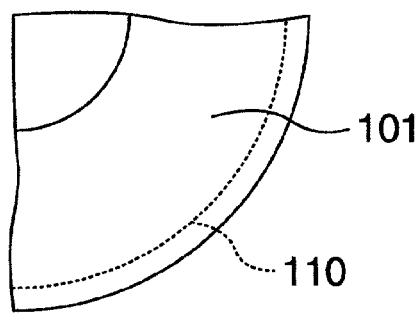

Therefore, the write current to the record head is turned off at time $t_2$ (302) corresponding to a range (303) previously decided according to the size of ramp road 103 and the outermost periphery of disk 101. Thus, the signal 110 (shown in FIG. 3C) is written along the outermost periphery of disk 101 at the same time as when the loading is made.

After the loading operation, the head 102 is fed until the actuator 105 comes in contact with the stopper 103, and the head feeding pitch is determined for the writing of propagation-purpose pattern. This procedure (steps S) will be described with reference to FIGS. 4~6.

First, after step 23 in FIG. 2, the head is moved until the actuator is made in contact with the stopper on the innermost periphery, and then a certain DC current is caused to flow in the VCM so that the actuator can be pressed against the stopper as shown in FIG. 4 (step 41).

Figure 5:
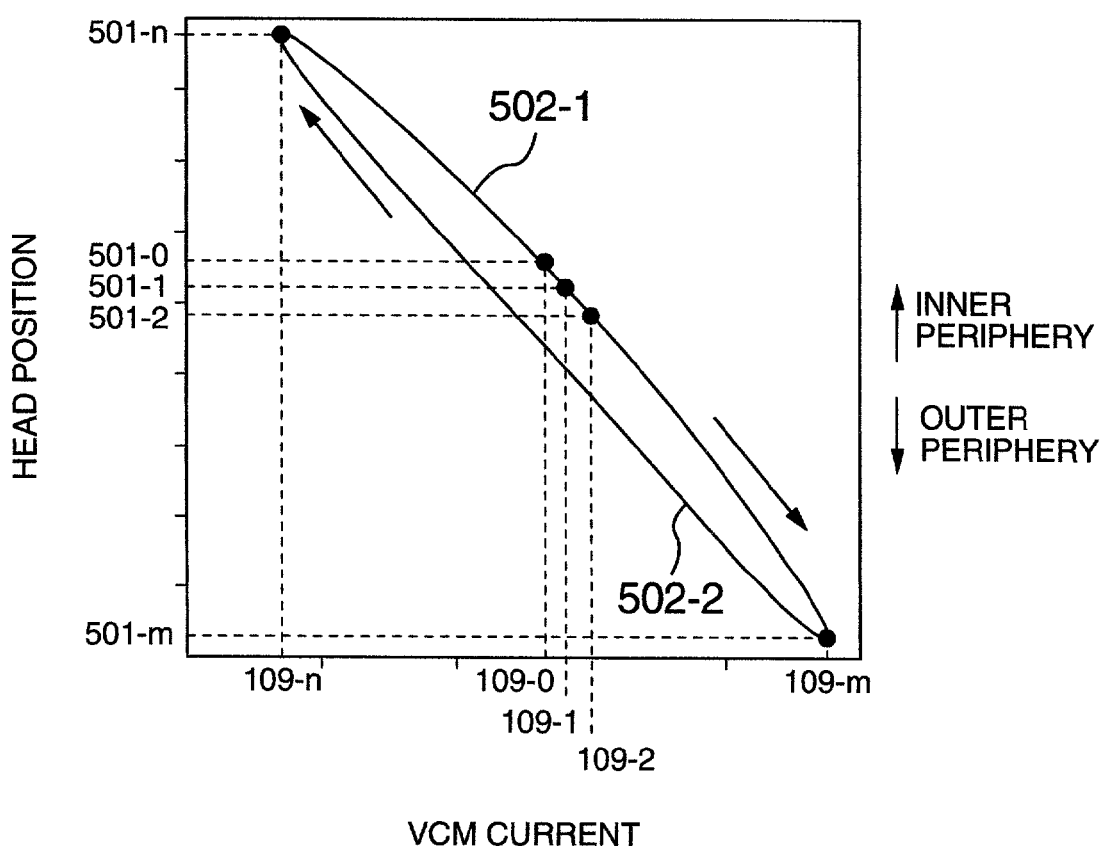
FIG. 5 is a graph showing the relation between VCM current and head position.

At this time, the value of the current flowing in the VCM is represented by 109-0. Also, a pattern of a constant frequency (All-1 pattern) is written along one full circle on the disk 101 at the radial position of the head corresponding to where the actuator has been pressed against the stopper (S42). Then, the current continuously caused to flow in the VCM in order for the actuator to be pressed is decreased in stages, and the head is started to move toward the outer periphery. FIG. 5 shows the relation between the VCM current and the radial position of the head.

By gradually decreasing the VCM current, which flows when the pattern has been written on the disk at step 42, as shown at 109-0, 109-1, 109-2 in turn, the head position is changed from 501-0 to 501-1, 501-2 toward the outer periphery.

Figure 6:
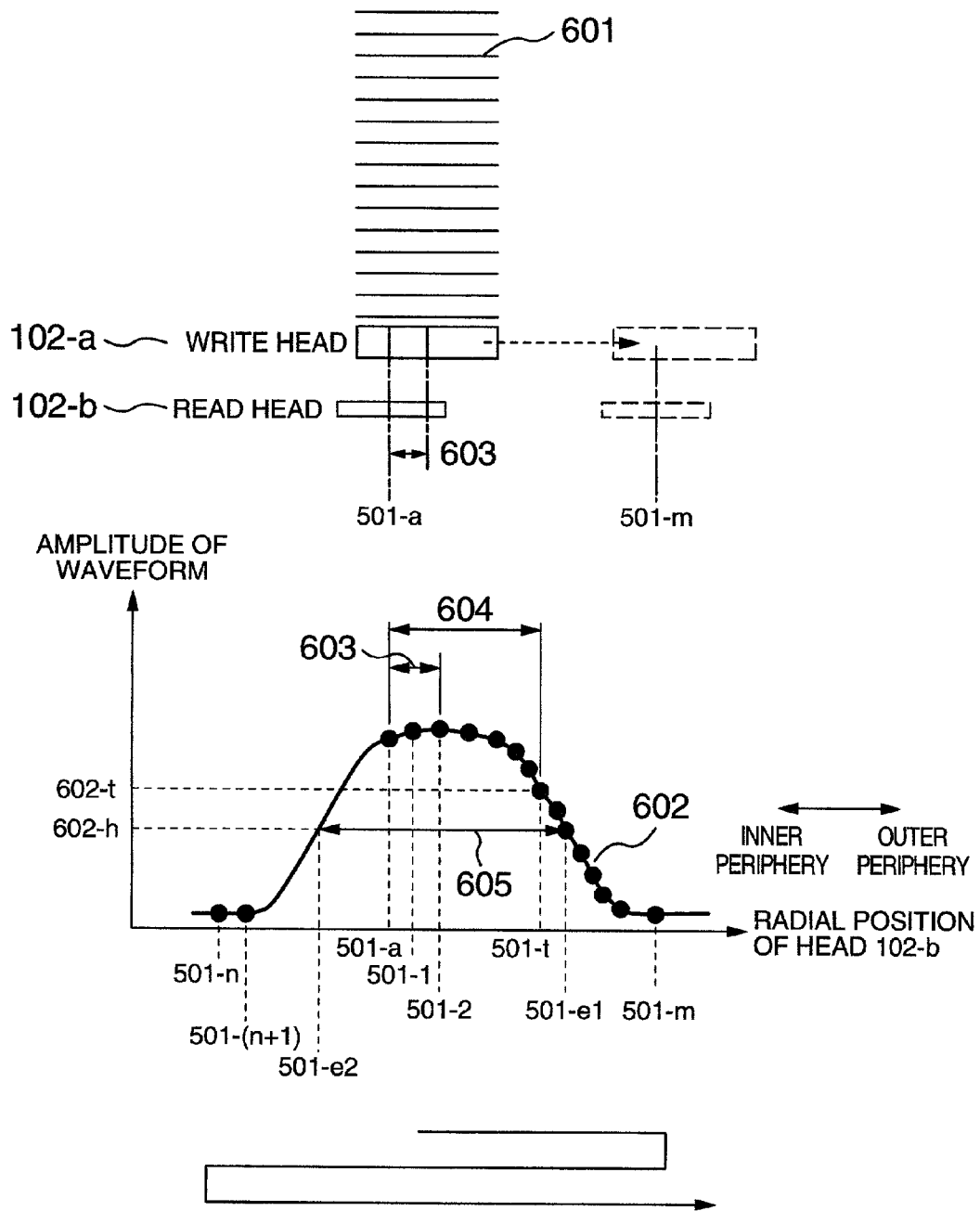
FIG. 6 is a diagram showing the movement of head at the time of measuring track width and R/W offset.

FIG. 6 shows the relation between the radial position of the head and the amplitude of the reproduced signal. The amplitude of signal reproduced at each stage to which the head is moved is converted to a digital value by the demodulator 107d, and stored in the memory 107g through the controller 107f (S43).

As shown in FIG. 5, after the VCM current is decreased up to a previously selected value 109-m in order for the head to move to 501-m, it is increased up to a previously selected value 109-n in order for the head to move to position 501-n toward the inner periphery (S44).

The VCM current is again decreased from 109-n to 109-(n+1) in stages in order for the head to move to the position where the amplitude is the maximum, and the amplitude at each stage is converted to a digital value by the demodulator 107d, and stored in the memory (S45).

Executing the procedure from step 401 to step 405 will form an off-track profile of reproduced amplitude as represented by reference numeral 602 in FIG. 6. The amount of R/W offset, 603 of the head is calculated from the distance between the head position 501-a at which the All-1 pattern has been written and the crest position (501-2, in this embodiment) of the obtained off-track profile.

Additionally, at this stage the effective track width is calculated. Typically, the magnetic track width can be represented by the distance between two points where the amplitudes in the off-track profile are 50% of the maximum.

Thus, first, each of the values stored in the memory, and a 50% value (602-h in FIG. 6) of the maximum in the off-track profile are compared with each other, i.e., the values stored in the memory that correspond to a range of the profile on the outer periphery side from the maximum amplitude point 501-2 are sequentially checked by comparing with the 50% value of the maximum amplitude. The result is that a point 501-e1 where the value stored in the memory initially becomes smaller than the 50% value is decided to be the edge position on the outer periphery side.

Similarly, the values stored in the memory that correspond to the other range of the profile on the inner periphery side are sequentially checked by comparing, so that the other edge point, 501-e2, on the inner periphery side can be obtained. Thus, a track width 605 is calculated from the distance between both the obtained edges (S46).

The operation for calculating the head feeding pitch at step 25 in FIG. 2 will be next described with reference to FIG. 6. At step 26, the head is offset a certain amount from the already recorded pattern, and a new track is recorded to form a pattern in that position.

This offset movement of the head is made by positioning the head so that the amplitude of the reproduced signal from the already recorded track can reach the target value. The targeted amplitude value depends on the ratio of the head's track width to the track pitch in the associated magnetic disk device. In this embodiment, the track pitch is selected to be 125% of the measured track width 605, and half the track pitch is decided to be a head feeding pitch 604.

In this case, the targeted amplitude value for the head to be fed to record is decided to be an amplitude 602-t at a position 501-t that is separated by the R/W offset 603 and the pitch 604 away from the write position 501-*a* toward the outer periphery side in the off-track profile 602.

After the head 102 is fed up to the stopper 106 on the innermost periphery, the propagation-purpose pattern is recorded by the procedure of steps 24, 25 and 26. When the head 102 arrives at around the outermost periphery, the signal 304 written at the time of loading is reproduced by the head 102.

Figure 7:
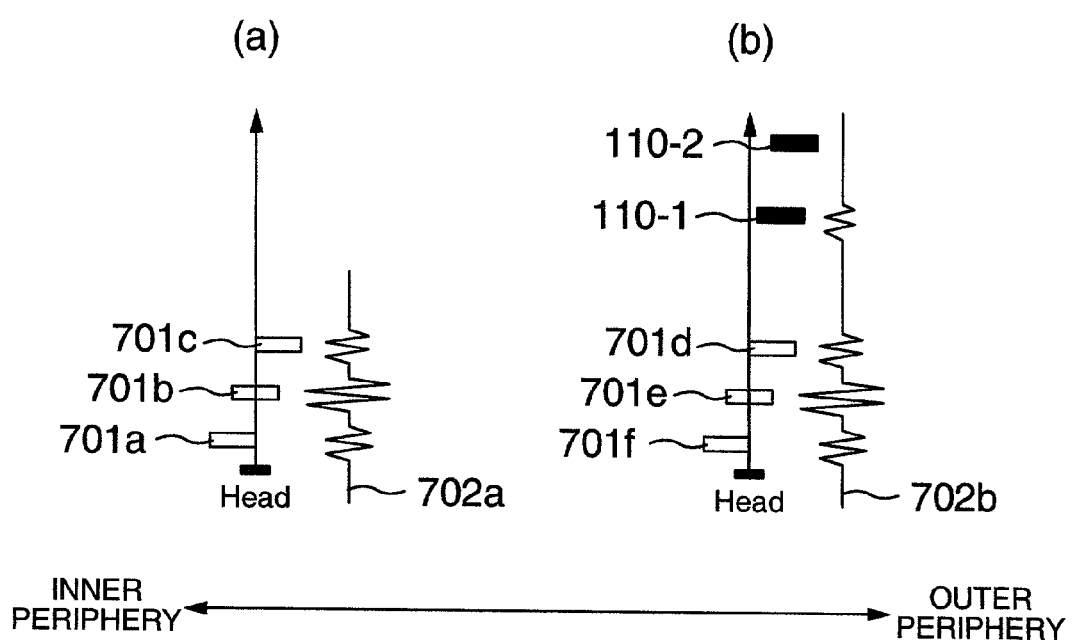
FIG. 7 is diagram showing propagation-purpose pattern signals and reproduced waveforms of written signal at the loading time.

FIG. 7 shows the reproduced waveforms of the propagation-purpose pattern and the signal written at the time of loading in this embodiment. A waveform 702*a* is a reproduced waveform in a place where the signal recorded at the time of loading in step 27 is not written. This reproduced waveform 702*a* is a waveform reproduced when a propagation-purpose pattern 701*c* is used as a position signal. In this case, since the signal recorded at the time of loading is not written, no position signal is detected on the outer periphery side of the propagation-purpose pattern 701*c*.

When the head reproduces the position signal on the outermost periphery 701*d* in step 27, the pattern signal written at the time of loading is reproduced except the propagation-purpose pattern. At this time, the reproduced waveform is a waveform 702*b*.

In this embodiment, the propagation pattern is detected in its amplitude at time 701*a*, 701*b*, 701*c* (701*d*, 701*e*, 701*f*), and the amplitude is converted to a digital value by the demodulator 107*d* and supplied to the controller 107*f* where the signals having larger amplitudes than background noise are fed to a register and counted.

Since the propagation-purpose pattern recorded from the inner periphery is written at a constant pitch on the disk, the number of detected signals having larger amplitudes than background noise is determined at certain points (three, as to the reproduced waveform 702*a*). However, on the outermost periphery, the signal written at the time of loading is also detected (four signals are detected as to the reproduced signal 702*b*). When more than four signals having large amplitudes than background noise are detected, the outermost periphery is detected.

When the propagation-purpose pattern is recorded up to the outermost periphery 110, the number of steps over which the head is fed can be known from the head feeding pitch 604 set in step 26. The head feeding pitch set in step 25 depends on the core width of the head, and thus the number of steps over which the head is fed varies due to the dispersion of the core width.

Figure 8:
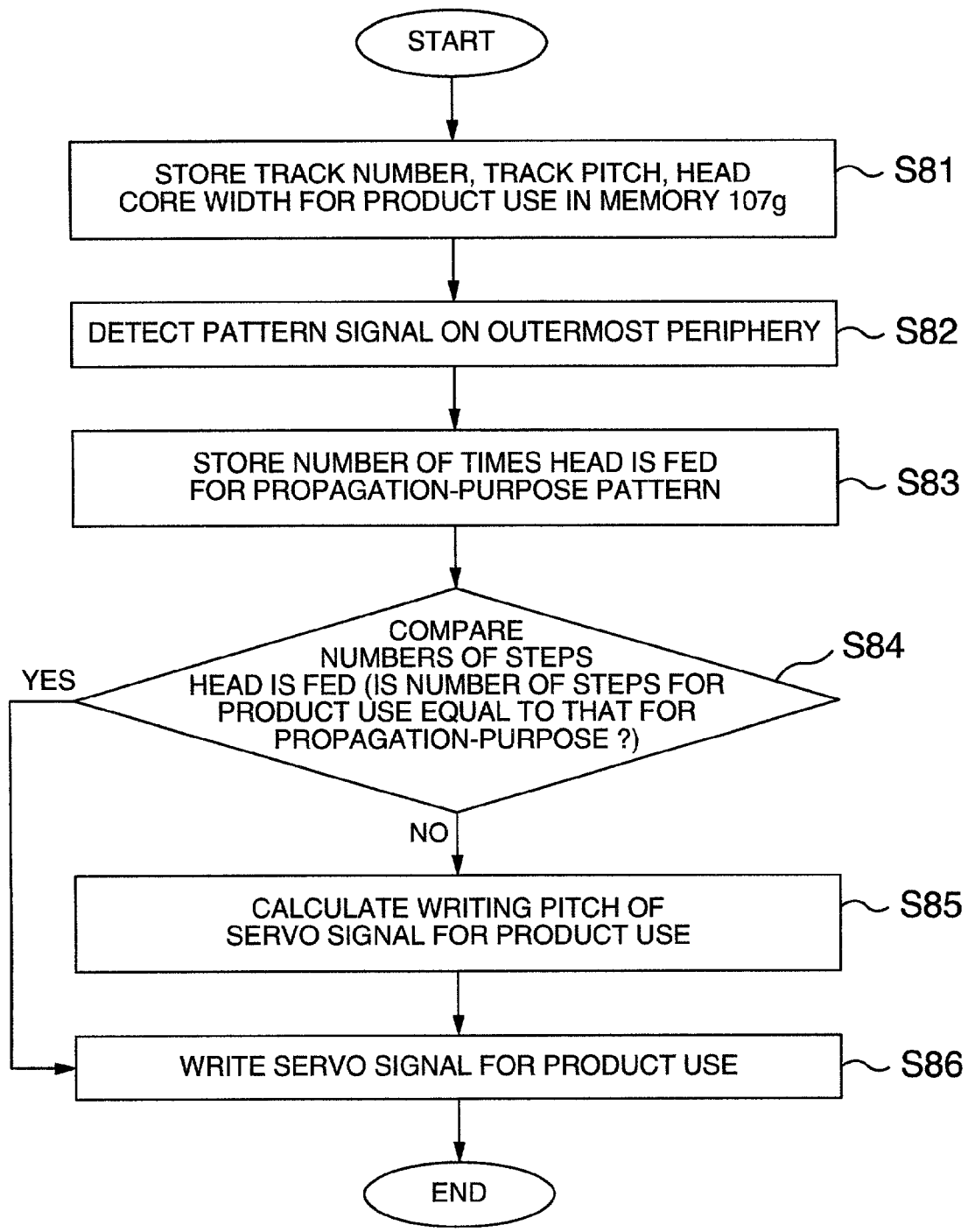
FIG. 8 is a flowchart for a procedure of calculating the feeding pitch for servo signal for product.

Thus, at the stage where the product-purpose servo signal is recorded, it becomes sometimes necessary that the feeding pitch be readjusted in order to provide a designed number of tracks. The feeding pitch of the product-purpose servo signal is readjusted according to the procedure (steps S) of FIG. 8 as follows.

The number of tracks, track pitch and head core width designed are previously stored in the memory 107*g* (S81). The propagation-purpose pattern is recorded in the radius direction, and the outermost periphery is detected by recognizing the pattern written at the time of loading (S82).

Until the outermost periphery is detected, the number of steps over which the head is fed in order to record the propagation-purpose pattern is counted by the controller 107*f*, and stored in the memory 107*g* (S83).

Then, the number of steps for the head to be fed over is calculated by the controller 107*f* from the designed track number, track pitch and head core width stored in the memory 107*g*, and compared with the number of steps over which the head has actually been fed (S84). Specifically, the number of steps can be calculated by multiplying the number of steps necessary to record one track by the number of tracks.

If the number of steps differs in both the designed and actual cases, the controller 107*f* can find the head feeding pitch for recording the production-purpose servo signal by multiplying the pitch at which the head has actually been fed by the ratio of the number of steps over which the head has actually been fed to the designed one (S85). Subsequently, the head is fed by a selected number of steps, and when the production-purpose servo signal has been completely recorded the servo-write operation is finished (S86).

Figure 9:
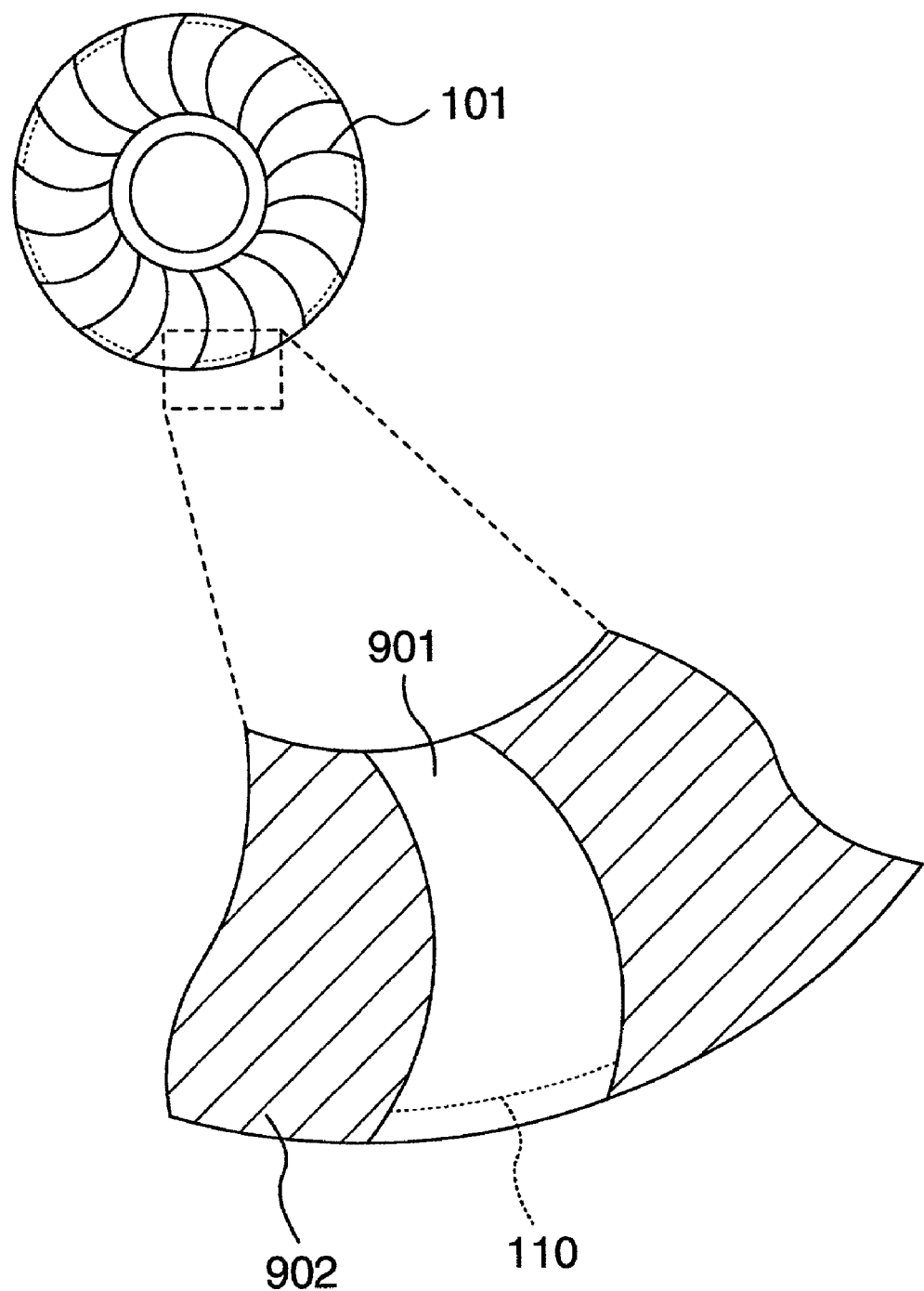
FIG. 9 is a pattern diagram of propagation servo signal and pattern signal.

A second method for detecting the outermost periphery will be described next. In this method, the surface of the disk 101 is divided into two regions that are alternately placed in the circumferential direction as shown in FIG. 9. In other words, these regions are an area 901 in which no propagation-purpose pattern is written, and an area 902 in which it is written.

At the time of loading, the signal 110 is written in the areas 901 in which no propagation-purpose pattern is written, in response to the timing signal generated from the spindle motor, and thus the areas 901 include the signal 110. The areas 901 in which no propagation-purpose pattern is written are monitored in response to the timing signal from the spindle motor. Just when the reproduced waveform of signal 110 is detected, the point of this instant is decided to be the outermost periphery.

Thus, the servo signal can be recorded at precisely a controlled track pitch by the head and actuator that the magnetic disk device itself has without recording a preliminary servo signal on a disk by using an external apparatus. Therefore, the clean room and external writing device can be omitted.

While the ramp road 103 is assumed to be on the outer periphery side in this embodiment, it may be provided on the inner periphery side provided that the positional relation between the inner and outer peripheries is reversed in the above method, and in this case the same effect as in the above embodiment can be achieved.

It should be further understood by those skilled in the art that the foregoing description has been made on embodiments of the invention and that various changes and modifications may be made in the invention without departing from the spirit of the invention and scope of the appended claims.

What is claimed is:

1. A magnetic disk device comprising:
   a magnetic disk for storing information;
   a spindle motor for driving said magnetic disk to rotate;
   a magnetic record head for recording information on said magnetic disk;
   a magnetic reproduce head for reproducing information from said magnetic disk;
   an actuator having a suspension for supporting said magnetic heads to be movable on said magnetic disk and drive means for driving said suspension;
   a loading/unloading path for loading/unloading said magnetic record head and said magnetic reproduce head onto/from said magnetic disk; and
   a stopper for limiting the movable range of said actuator, wherein a recording region detecting signal is written on said magnetic disk just when said magnetic heads are loaded on said magnetic disk that has no positioning signal recorded for positioning said magnetic heads, and a track region on said magnetic disk is determined on the basis of the position at which said recording region detecting signal has been written;

wherein a propagation-purpose pattern is sequentially recorded on said magnetic disk from a stop position at which said magnetic heads are stopped by said stopper in the radius direction, and when said recording region detecting signal is detected, the detected position is determined to be one end of said track region.

2. A magnetic disk device comprising:
a magnetic disk for storing information;
a spindle motor for driving said magnetic disk to rotate;
a magnetic record head for recording information on said magnetic disk;
a magnetic reproduce head for reproducing information from said magnetic disk;
an actuator having a suspension for supporting said magnetic heads to be movable on said magnetic disk and drive means for driving said suspension;
a loading/unloading oath for loading/unloading said magnetic record head and said magnetic reproduce head onto/from said magnetic disk; and
a stopper for limiting the movable range of said actuator, wherein a recording region detecting signal is written on said magnetic disk just when said magnetic heads are loaded on said magnetic disk that has no positioning signal recorded for positioning said magnetic heads, and a track region on said magnetic disk is determined on the basis of the position at which said recording region detecting signal has been written;
wherein a head feeding pitch at which a product-purpose servo signal is recorded is calculated from the number of times that said magnetic head is fed for recording a propagation-purpose pattern to move from a stop position at which said magnetic head is stopped by said stopper to a position at which said recording region detecting signal is detected, and a designed number of tracks.

3. A magnetic disk device according to claim 2, further having a pattern according to said head feeding pitch at which said head is fed to record said product-purpose servo signal, and said propagation-purpose pattern formed at a head feeding pitch according to the size of said magnetic record head.

4. A servo-write method comprising:
starting a spindle and setting to a predetermined rotational speed;
writing a recording region detecting signal on a magnetic disk on which no positional signal is recorded, by turning on a write current during a predetermined period when a magnetic head is moved from a load/unload path onto an area on a first periphery of said magnetic disk;
moving said magnetic head to a opposite periphery of said magnetic disk from said first periphery, until an actuator hits a stopper defining said opposite periphery of said magnetic disk;
recording a propagation-purpose pattern which is used to determine a magnetic head position when a servo signal is recorded later in a radial direction, by moving said magnetic head at a predetermined feed pitch until said recording region detecting signal is detected, said feed pitch being determined so as to correspond to a predetermined rate of level of said propagation-purpose pattern detected just after the propagation-purpose pattern is written by said magnetic head;
calculating a pitch of head feeding for writing a product-purpose servo signal by which said magnetic head can be located at a certain track in order to write/read information, on a basis of amounts of head feeding from said opposite periphery to a point where said recording region detecting signal is recorded and a number of tracks; and
recording said product-purpose servo signal sequentially onto a predetermined area between a position of said opposite periphery of said magnetic disk and a position at which said recording region detecting signal is recorded.

5. The servo-write method according to claim 4, wherein said recording region detecting signal is recorded on said magnetic disk between said load/unload path and a recorded said product-purpose servo signal.

6. The servo-write method according to claim 4, wherein said writing a recording region detecting signal comprises operations of calculating said predetermined period on a basis of distance of movement and a movement speed of said magnetic head.

7. The servo-write method according to claim 4, wherein said first periphery is an outer periphery of said magnetic disk, said load/unload path is a load/unload ramp located at said outer periphery of said magnetic disk, and said opposite periphery is an inner periphery of said magnetic disk.

8. The servo-write method according to claim 4, comprising defining a track region to be an interval between said position at which said recording region detecting signal has been written, and a position at which said magnetic heads are stopped by said stopper.

9. A magnetic disk device comprising:
a magnetic disk for storing information;
a spindle motor for driving said magnetic disk to rotate;
a magnetic read/write head; and
a servo-write unit to;
write a recording region detecting signal on the magnetic disk on which no positional signal is recorded, by turning on a write current during a predetermined period when the magnetic head is moved from a load/unload path onto an area on a first periphery of said magnetic disk;
move said magnetic head to a opposite periphery of said magnetic disk from said first periphery, until an actuator hits a stopper defining said opposite periphery of said magnetic disk;
record a propagation-purpose pattern which is used to determine a magnetic head position when a servo signal is recorded later in a radial direction, by moving said magnetic head at a predetermined feed pitch until said recording region detecting signal is detected, said feed pitch being determined so as to correspond to a predetermined rate of level of said propagation-purpose pattern detected just after the propagation-purpose pattern is written by said magnetic head;
calculate a pitch of head feeding for writing a product-purpose servo signal by which said magnetic head can be located at a certain track in order to write/read information, on a basis of amounts of head feeding from said opposite periphery to a point where said recording region detecting signal is recorded and a number of tracks; and
record said product-purpose servo signal sequentially onto a predetermined area between a position of said opposite periphery of said magnetic disk and a position at which said recording region detecting signal is recorded.

10. A magnetic disk device according to claim 9, wherein said recording region detecting signal is recorded on said magnetic disk between said load/unload path and a recorded said product-purpose servo signal.

11. A magnetic disk device according to claim 9, wherein said write of a recording region detecting signal comprises operations of calculating said predetermined period on a basis of distance of movement and a movement speed of said magnetic head.

12. A magnetic disk device according to claim 9, wherein said first periphery is an outer periphery of said magnetic disk, said load/unload path is a load/unload ramp located at said outer periphery of said magnetic disk, and said opposite periphery is an inner periphery of said magnetic disk.

13. A magnetic disk device according to claim 9, comprising defining a track region to be an interval between said position at which said recording region detecting signal has been written, and a position at which said magnetic heads are stopped by said stopper.

* * * * *